United States Patent [19]

Wright

[11] Patent Number: 4,906,273

[45] Date of Patent: Mar. 6, 1990

[54] PLANT GROWTH MEDIUM

[76] Inventor: Wilburn T. Wright, P.O. Box 1572, Fort Myers, Fla. 33902

[21] Appl. No.: 320,813

[22] Filed: Mar. 10, 1989

Related U.S. Application Data

[63] Continuation of Ser. No. 147,076, Jan. 20, 1988, abandoned, which is a continuation of Ser. No. 860,327, May 6, 1986, abandoned.

[51] Int. Cl.$^4$ .................................................. C05F 5/00
[52] U.S. Cl. ............................................. 71/9; 71/25
[58] Field of Search ........................... 71/1, 3, 6, 8–10, 71/25, 26, 67, 88, 94, 95

[56] References Cited

U.S. PATENT DOCUMENTS

| | | | |
|---|---|---|---|
| 3,346,447 | 10/1967 | Wright | 167/31 |
| 3,988,350 | 10/1976 | Copes et al. | 71/88 |
| 4,164,405 | 8/1979 | Pinckard | 71/24 X |

*Primary Examiner*—Ferris H. Lander
*Attorney, Agent, or Firm*—Stevens, Davis, Miller & Mosher

[57] ABSTRACT

An improved plant growth medium is prepared by treating a conventionally composted bio-mass waste material with an aqueous solution or dispersion of an antimicrobial in an amount which selectively inhibits deleterious rhizobacteria.

12 Claims, No Drawings

PLANT GROWTH MEDIUM

This application is a continuation of application Ser. No. 147,076, filed Jan. 20, 1988, which is a continuation of application Ser. No. 860,327, filed May 6, 1986, both now abandoned.

This invention relates to an improved plant growth medium prepared from a composted bio-mass waste material.

BACKGROUND OF THE INVENTION

The practice of agriculture produces, as a by-product, large amounts of waste materials of vegetable origin. Heretofore, such waste materials were disposed of by burning or by removal to a dump. The lack of available dump sites and increasingly more stringent federal and local regulations regarding burning, transporting and dumping of waste materials has made disposal of such materials more difficult.

It is known that waste materials of vegetable origin can be converted by composting to a humus-like substance, or organic soil, useful in supporting plant growth, while at the same time suppressing or eliminating soil-borne plant pathogenic microorganisms, viruses, insects, weed seeds and certain organic insecticidal and herbicidal residues and related materials harmful to animals and to plant growth. The beneficial effort of mixing of soil with humus obtained by composting vegetable waste, or the application of such humus to soil, was attributed to the presence of organic fibers, nutrients and various trace minerals in the humus.

Cotton gin waste is an example of troublesome, yet potentially valuable vegetable waste material. As taught in U.S. Pat. Nos. 4,164,405 and 4,229,442, cotton gin waste is produced in great quantities, about 150 pounds of waste per each 500-pound bale of cotton lint. In previous years, cotton gin waste was burned in open refuse burners producing a smoke which contained various toxic substances, including those derived from pesticidal chemicals used to treat growing cotton. Primarily for that reason, the open burning of cotton gin waste is now prohibited. Also, because cotton gin waste may contain plant pests, it cannot legally be moved off the premises where the gin is located unless certified free of pests by the U.S. Department of Agriculture, Animal and Plant Health Inspection Service.

Cotton gin waste is an excellent organic fertilizer, except that like other agricultural waste materials it may contain plant disease-causing agents, insects, weed seeds and pesticidal residues detrimental to plant growth. Likewise, it also contains microorganisms, the most commonly present being mesophylic forms of bacterial, fungi and actinomycetes commonly found in soil at temperatures up to about 105° F.

Various composting processes are known for converting cotton gin waste into a useful humus-like material. As the temperature increases during composting, most of the insects, weed seeds and pesticidal residues are killed or destroyed. Also, essentially all of the mesophylic plant pathogens are killed. Then, the thermophyllic fungi, bacteria and actinomycetes flourish bringing the temperature of the compost pile up to about 140° to 150° F.

During and after composting, various microbial biodegradation products are released in the compost as metabolic by-products of the multiplicity of microbial species present in the compost pile. Certain of these microbial biodegradation compounds are antagonistic to *Rhizoctonia solani* and other plant disease-causing agents, and can be designated as antibiotics. Contrary to the situation in untreated soils, these antibiotics are continuously regenerated for several months as the microorganisms present continue to ferment the carbon and nitrogen containing sources still available.

U.S. Pat. Nos. 3,420,936 and 3,346,447 teach the use of hexachlorophene, 2,2'-methylene-bis-(3,4,6-trichlorophenol), and its salts, as an antimicrobial to control fungal and bacterial diseases attacking the foliage of plants and to control plant fungal diseases in the soil. Previous workers assumed that the beneficial results obtained by the treatment of soil or the like with chemical antimicrobials was due to control of one or more of the fungal pathogens present. However, in 1982, Schroth and Hancock reported, in *Science*, Vol. 216, June, 1982, that microorganisms in and around the roots of a plant could influence the growth of the plant in a positive manner. They reported that root microflora can be altered qualitatively and quantitatively by inoculation of seeds, seed pieces or roots with beneficial bacteria and fungi, such as certain species of *Rhizobacteria*, and this can lead to substantial increases in plant growth.

Schroth and Hancock classified microorganisms as plant growth-promoting rhizobacteria (PGPR) and deleterious rhizobacteria (DR). They pointed out that the greatest prospects for substantially increasing plant yields and making a dramatic change in agricultural practices may involve beneficial microorganisms that protect plant roots from the many deleterious microorganisms that occur in all agricultural soils.

BRIEF DESCRIPTION OF THE INVENTION

We have discovered that an improved plant growth medium is obtained when a composted bio-mass waste is treated with an appropriate amount of antimicrobial prior to use.

In one aspect, the present invention is a process for making an improved plant growth medium which comprises contacting a composted bio-mass waste mateerial with an aqueous solution or dispersion of an antimicrobial in an amount which selectively inhibits deleterious rhizobacteria, and without inhibiting plant growth-promoting rhizobacteria. The present invention also contemplates the improved plant growth medium so prepared.

In another aspect, the present invention is a method for promoting the growth of plants which comprises applying to the locus of the plant, the improved medium of the invention prepared as described in the previous paragraph. The plant whose growth is to be promoted may be grown in the improved medium or in conventional media admixed with or top-dressed with the improved growth medium of the present invention.

DETAILED DESCRIPTION OF THE INVENTION

In practicing the process of the present invention, one starts with a properly composted bio-mass waste material. For example, cotton gin waste composted using known composting procedures, such as described in U.S. Pat. Nos. 2,867,521; 4,164,405; and 4,229,442. The compost obtained by conventional composting of cotton gin waste generally contains 25 to 35% by weight of moisture, or about 500 to 700 pounds or from 63 to 88 gallons of water per ton of compost. The compost is contacted with water generally containing from 5.0 to 25.0 ppm of antimicrobial at the approximate rate of about 160 pounds (20 gallons) of water containing the antimicrobial per ton of compost, using any convenient method of application. For example, the antimicrobial dissolved or suspended in water is sprayed onto the compost pile using a fine spray and moving or multiple spray nozzles. The compost pile is already quite wet, and the spray solution will run through the pile. The treating process can be improved by mixing or turning the pile during or immediately after spraying. The treated pile contains about 0.4 to 2.0 grams of antimicrobial per ton of compost, based on the calculated weight of the pile.

Other commonly available bio-mass waste materials are rotted or spoiled legume hay and sugar cane residue (bagasse). The legume hay can be composted in a manner similar to that used to compost cotton gin wastes. A source of available nitrogen is preferably added when composting bagasse or other waste material having a low content of nitrogen. Also, with materials having a relatively low microbial population, such as bagasse, composting is promoted by innoculation with a microbial "starter" obtained from an actively working compost heap or other suitable source.

Well rotted forest leaves (leaf-molds) or other organic soils are equivalent to composted bio-mass waste materials as starting materials to be contacted with an antimicrobial in practicing the preparative process of the present invention.

Preferred antimicrobials for use in the spraying treatment are hexachlorophene and alkali metal salts thereof, and particularly the sodium salt, such as described in U.S. Pat. Nos. 3,346,447 and 3,420,936. Other suitable microbiocides or antimicrobials are bis(trichlorophenyl) sulfoxide 2,4,5-trichlorosaligenol; dimethyl sulfoxide trichlorophenol and hexachlorofluorescin. As used herein, an antimicrobial is a substance which kills microbes such as bacteria and fungi, i.e., exhibits activity as a bactericide and/or a fungicide.

The compost, after treatment with the antimicrobial, preferably should stand in contact with the antimicrobial for a few days prior to use.

Without limiting my invention to any theoretical mode of operation, it is believed that conventional composting eliminates fungi, which are harmful to plants, particularly those of ornamental or food value, such as Rhizoctonia, Thielaviopsis, Verticillium, Phytophthera, Pythium and Fusarium, and *Rhizotonia solani*, in particular. After treatment with the antimicrobial, microorganisms beneficial to plant growth, such as the plant growth promoting rhizobacteria (PGPR), proliferate in the treated compost pile, and in the treated compost when mixed with or applied to soil or other growth media.

The improved medium of the present invention can be used alone as a postting medium or in flats to start or grow plants and vegetables. However, it is more often used in admixture with other plant growth media such as peat moss, vermiculite, bark, wood shavings, sand, perlite, mulch, and the like. The presence of as little as 5-10% of the improved medium of the invention markedly enhances the plant growth capability of mixtures containing that medium.

It is emphasized that, although the examples which follow illustrate practice of the present invention using particular bio-mass waste materials and specified quantities of antimicrobial and compost, the invention is not limited to those materials or to the quantities specified. The present invention is based on the broader discovery that treatment of composted bio-mass waste materials with an antimicrobial in an amount which inhibits deleterious rhizobacteria without inhibiting plant growth-promoting bacteria, yields a superior plant growth medium. Such selective inhibition of the deleterious rhizobacteria permits subsequent rapid proliferation of plant growth-promoting rhizobacteria. As illustrated in the examples, the microbiocidally or antimicrobially treated compost is surprisingly superior as a plant growth promotant, as compared to conventially prepared compost untreated with antimicrobial.

EXAMPLE 1

This example illustrates the preparation of an improved compost using the process of the present invention.

First, cotton gin waste is composted in a conventional manner, for example, as described in U.S. Pat. Nos. 2,867,521; 4,164,405; and/or 4,229,442. A typically composting process starts with the building of large piles of cotton gin waste, which are then moistened with water and turned. Due to microbial action, the temperature within the piles begins to rise within 12 to 16 hours. Thermometers are placed in the piles to monitor the rate of composting, so that temperatures in excess of 180° F. can be avoided. Thus, should the temperature within the compost piles rise too quickly, the pile is spread out to prevent heat damage. While the temperature during composting can reach 180° F., it usually does not go above 160° F., and normally is between 130° and 150° F. The temperature of a freshly built pile of cotton gin waste typically rises to a peak in about 24 to 48 hours after turning, and falls several days later to ambient temperature 85° F. By proper adjustment of the rate of aeration, water content, and physical shape and size of the compost piles, the biodegradation taking place destroys essentially all of the plant pathogens initially present. Then, the compost pile is drenched with 20 gallons (160 lbs) of water containing 5.0 to 25.0 ppm of hexachlorophene per ton of wet compost. The pile is then turned and mixed soon after the drench treatment in order to obtain a uniform concentration of the antimicrobial throughout the composted cotton gin waste.

It is important to note that the starting composted cotton gin waste was essentially free of pathogenic fungi. Nevertheless, treatment of that compost gave an improved compost superior as a plant growth promotant when compared to untreated compost, as illustrated in the following examples.

EXAMPLE 2

Three adjacent flats were planted with snow peas. The first flat contained improved composted cotton gin waste according to the present invention, the second flat contained conventional composted cotton gin waste, and the third flat contained FLA sand mixed with a commercial potting soil. Ten seeds from the same lot were planted in each flat and were thinned to four plants per flat to avoid root binding. After about fourteen weeks, the pea plants were harvested by cutting off at soil level and weighed. The weights were as follows:

Improved Composted Cotton Gin Waste: 564 grams
Conventional Composted Cotton Gin Waste: 334 grams Sand and Potting Soil Mixture: 41 grams The experiment was repeated using improved composted cotton gin waste compost according to the invention and conventionally composted cotton gin waste. On visual examination, the improved compost gave about double the growth of the conventional compost.

EXAMPLE 3

Silver Queen sweet corn yielded 7 ears per seed when grown in improved composted cotton gin waste prepared as in Example 1, as compared to 1 to 2 ears in normal soil.

EXAMPLE 4

Wheat showed 11 stalks per seed in the improved composted cotton gin waste prepared as in Example 1, as compared to 5 stalks per seed obtained using conventional cotton gin waste compost.

EXAMPLE 5

Sunflowers produced up to 14 flowers per seed in the improved composted cotton gin waste of Example 1, as compared to the 1 flower per seed in conventional composted cotton gin waste.

EXAMPLE 6

Cucumbers grew twice as fast in improved cotton gin compost as those grown in conventionally composted cotton gin waste.

EXAMPLE 7

Extensive seedling trials were conducted with tomatoes. About 25,000 plants were grown in a conventional potting mix; 25,000 plants were grown in a conventional potting mix supplemented with 10% (V/V) of improved cotton gin waste compost, and another 25,000 plants were grown in conventional potting soil containing 20% (V/V) composted cotton gin waste. The plants in the conventional potting mix were watered and fertilized on a normal schedule. Those in the supplemented mixes were not fertilized, but were watered as needed, and had a growth retardant applied. At 17 days, the plants in the groups with treated composted cotton gin waste were visibly larger than the plants in the normal mix. The weights per plant were:

Conventional Potting Mix: 0.9 grams
Potting Mix Supplemented With 10% Improved Composted Cotton Gin Waste: 1.5 grams
Potting Mix Supplemented With 20% Improved Composted Cotton Gin Waste: 1.9 grams

I claim:

1. In a process for making a plant growth medium including the steps of composting a bio-mass waste material by building a pile of the waste material; moistening the pile with water; and turning, whereby the temperature within the pile is caused to rise; and obtaining a composted bio-mass waste material;

the improvement comprising drenching the composted bio-mass waste material with an aqueous solution or dispersion of an antimicrobial selected from the group consisting of hexachlorophene, the alkali metal salts thereof, bis(trichlorophenyl) sulfoxide, 2,4,5 trichlorsaligenol, dimethyl sulfoxide trichlorophenol and hexachlorfluorescin in an amount which inhibits deleterious rhizobacteria without inhibiting plant growth-promoting rhizobacteria.

2. A process according to claim 1, wherein the antimicrobial is hexachlorophene or an alkali metal salt thereof.

3. A process according to claim 2, wherein the antimicrobial is the sodium salt of hexachlorophene.

4. An improved plant growth medium produced by the process of claim 1.

5. An improved plant growth medium according to claim 4, wherein the antimicrobial is hexachlorophene or an alkali metal salt thereof.

6. An improved plant growth medium according to claim 5, wherein the antimicrobial is the sodium salt of hexachlorophene.

7. An improved plant growth medium according to claim 4, containing 2 to 10 grams of antimicrobial per ton, dry basis.

8. An improved plant growth medium according to claim 4, wherein the composted bio-mass waste material is composted cotton gin waste.

9. A method for promoting plant growth, which comprises applying to the locus of the plant an improved plant growth medium produced by the process of claim 1.

10. A method according to claim 9, wherein the composted bio-mass waste material is composted cotton gin waste.

11. A method according to claim 9, wherein the improved plant growth medium is admixed with the medium in which the plant is to be grown.

12. A method according to claim 9, wherein the improved compost is applied to the medium in which the plant is growing.

* * * * *